United States Patent Office 3,661,917
Patented May 9, 1972

3,661,917
3-SULFONAMIDO-4-HYDROXYPHENYL-
2-PIPERIDYLCARBINOLS
Carl Kaiser, Haddon Heights, N.J., and Stephen T. Ross, Berwyn, Pa., assignors to Smith Kline & French Laboratories, Philadelphia, Pa.
No Drawing. Continuation-in-part of application Ser. No. 39,561, May 21, 1970. This application Mar. 26, 1971, Ser. No. 128,566
Int. Cl. C07d 29/34
U.S. Cl. 260—293.73                     10 Claims

ABSTRACT OF THE DISCLOSURE 3-sulfonamido - 4 - hydroxyphenyl-2-piperidylcarbinols prepared by appropriate reduction of 2-pyridylcarbinols or ketones have $\beta$-adrenergic stimulant activity. Erythro and threo diastereoisomers may be conveniently separated.

---

This application is a continuation-in-part of application Ser. No. 39,561 filed May 21, 1970.

This invention relates to novel 3-sulfonamido-4-hydroxyphenyl-2-piperidylcarbinols which have useful pharmacodynamic activity. More specifically the compounds of this invention have utility as $\beta$-adrenergic stimulants with relatively greater activity on respiratory smooth muscle than on cardiac muscle. Therefore these compounds have direct bronchodilator action with minimal cardiac stimulation as demonstrated in standard pharmacological test procedures.

Two in vitro test systems used for determining selective $\beta$-stimulant activity are: (1) effect on spontaneous tone of guinea pig tracheal chain preparations as a measure of $\beta$-stimulant (direct relaxant effect on airway smooth muscle, and (2) effect on rate of spontaneously beating right atria of the guinea pig as a measure of $\beta$-stimulant effect on cardiac muscle. The compounds of this invention have selective bronchodilating properties since they are active in (1) above at a dose lower than is required in (2) above resulting in a positive separation ratio.

The compounds of this invention are represented by the following general structural formula:

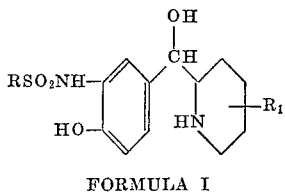

FORMULA I in which:

R represents lower alkyl, straight or branched chain, of from 1 to 4 carbon atoms, phenyl, tolyl, chlorophenyl, methoxyphenyl or hydroxyphenyl; and $R_1$ represents hydrogen, lower alkyl, straight or branched chain, of from 1 to 5 carbon atoms, phenyl, benzyl or phenoxy.

Advantageous compounds of Formula I are those wherein R is lower alkyl, preferably methyl, and $R_1$ is hydrogen.

The compounds of this invention may be used in the form of a pharmaceutically acceptable acid addition salt having the utility of the free base. Such salts, prepared by methods well known to the art, are formed with both inorganic or organic acids, for example: maleic, fumaric, benzoic, ascorbic, pamoic, succinic, bismethylenesalicyclic, methanesulfonic, ethanedisulfonic, acetic, oxalic, propionic, tartaric, salicyclic, citric, gluconic, lactic, malic, mandelic, cinnamic, citraconic, aspartic, stearic, palmitic, itaconic, glycolic, p-aminobenzoic, glutamic, benzenesulfonic, hydrochloric, hydrobromic, sulfuric, cyclohexylsulfamic, phosphoric and nitric acids.

Further the compounds of this invention may be present as diastereoisomers and are designated as erythro-and threo-isomers which may be resolved as $d$, $l$ optical isomers. Unless otherwise specified in the description and accompanying claims, it is intended to include all isomers, whether separated or mixtures thereof.

A preferred compound of this invention is 3-methanesulfonamido - 4 - hydroxyphenyl - 2 - piperidylcarbinol which relaxes the spontaneous tone of guinea pig tracheal ring preparation at an $ED_{50}$ of 0.012 mcg./ml. while increasing the rate of contraction of guinea pig right atria at an $ED_{25}$ of 0.11 mcg./ml. These activities give an absolute separation ratio of 10 which is a twenty-fold improvement when compared to the corresponding activity of $d$, $l$ isoproterenol (absolute separation ratio=0.5) is similar in in vitro preparations.

The compounds of this invention where $R_1$ is hydrogen are prepared from a sequence of reactions shown as follows:

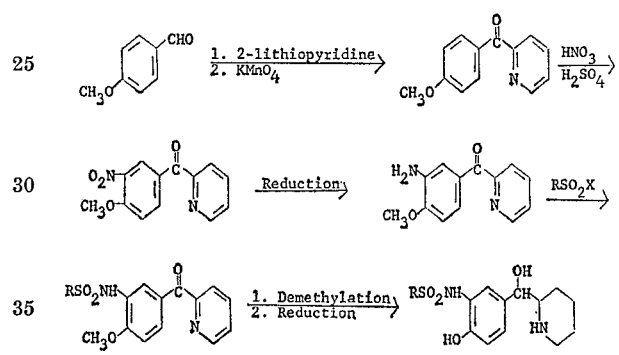

in which R is as defined above and X is halogen, preferably chlorine. Thus, as shown above, a lower alkyl ether derivative of a hydroxybenzaldehyde is condensed with a 2-metallopyridine derivative (prepared from a 2-halopyridine, preferably bromo, and an organometal derivative, preferably butyl lithium, or 2-chloropyridine and magnesium) in an organic nonreactive solvent such as tetrahydrofuran or ether to give a substituted phenyl 2-pyridylcarbinol which is oxidized for example with potassium permanganate to the corresponding ketone. The latter is nitrated with nitric acid/sulfuric acid or nitric acid alone at 10–15° C. and reduced with for example palladium-on-carbon and hydrogen or sodium sulfhydrate (NaSH·2H₂O) in aqueous methanol to give the amino substituted phenol 2-pyridylketone. The amino ketone is reacted for example in pyridine solution with an appropriately substituted sulfonyl halide, preferably chloride, to yield the sulfonamido substituted phenyl 2-pyridylketone which is demethylated with for example boron tribromide or sodium sulfhydrate in dimethylformamide and then reduced with for example platinum oxide and hydrogen to give the piperidylcarbinol product.

To prepare the compounds of this invention where $R_1$ is lower alkyl, phenyl, benzyl or phenoxy, a sulfonamido substituted benzaldehyde of the following formula:

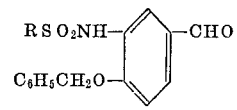

FORMULA II in which R is as defined above, is condensed with an appropriately substituted picolinic acid in an unreactive organic solvent at a temperature of from about 125-200° C., preferably at reflux temperature of the solvent, to yield the corresponding sulfonamido substituted phenyl 2-pyridylcarbinol derivative. The latter is reduced with platinum oxide and hydrogen to give the 2-piperidylcarbinol which is then debenzylated with palladium-on-carbon and hydrogen to yield the sulfonamido substituted hydroxyphenyl 2-piperidylcarbinol.

It will be appreciated that the benzaldehydes of Formula II above are useful intermediates in the preparation of products of this invention and as such form a part of the invention. These compounds are prepared as follows: 3-nitro-4-hydroxybenzaldehyde is converted to the ethylene acetal by means of ethylene glycol and p-toluenesulfonic acid; the acetal is reacted with benzylchloride in dimethylformamide to give the 3-nitro-4-benzyloxybenzaldehyde, ethylene acetal; the latter is reduced to 3-amino-4-benzyloxybenzaldehyde, ethylene acetal using platinum oxide and hydrogen; this amino compound is reacted in pyridine solution with an R-substituted sulfonyl halide, preferably chloride, to yield the 3-sulfonamido-4-benzyloxybenzaldehyde, ethylene acetal; and the acetal is hydrolyzed with aqueous acetic acid to generate the aldehyde.

The substituted picolinic acids employed as above are known or are prepared by methods known in the art, for example by oxidation of a 2-picoline with potassium permanganate.

The compounds of this invention may be administered orally or parenterally in conventional dosage unit forms such as tablets, capsules, injectables or the like, by incorporating the appropriate dose of a compound of Formula I, with carriers according to accepted pharmaceutical practices. Preferably a compound or an acid addition salt thereof is administered orally to an animal organism in a tablet or capsule comprising an amount sufficient to produce β-adrenergic stimulant activity. Each dosage unit will contain the active medicament in an amount of about 0.5 mg. to about 80 mg., preferably about 1 mg. to about 40 mg. Advantageously equal doses will be administered 2 to 4 times daily with the daily dosage regimen being about 1 mg. to about 320 mg., preferably about 2 mg. to about 160 mg.

The pharmaceutical carrier employed may be, for example, either a solid or liquid. Exemplary of solid carriers are lactose, terra alba, sucrose, talc, gelatin, agar, pectin, acacia, magnesium stearate, stearic acid and the like. Exemplary of liquid carriers are syrup, peanut oil, olive oil, water and the like. Similarly the carrier or diluent can include any time delay material well known to the art, such as glyceryl monostearate or glyceryl distearate alone or with a wax.

A wide variety of pharmaceutical forms can be employed. Thus, if a solid carrier is used the preparation can be tableted, placed in a hard gelatin capsule in powder or pellet form, or in the form of a troche or lozenge. The amount of solid carrier will vary widely but preferably will be about 25 mg. to about 1 g. If a liquid carrier is used, the preparation will be in the form of a syrup, emulsion, soft gelatin capsule, sterile injectable liquid such as an ampule, or an aqueous or nonaqueous liquid suspension.

Of particular applicability is an aerosol dispensing system wherein the active medicament is incorporated with Freon (fluorohydrocarbon) or other inert propellant in an aerosol container. Such an aerosol system will deliver a metered dose of about 50 mcg. to about 1600 mcg., administered as needed.

The foregoing is a general description of how to prepare the compounds of this invention. The following examples illustrate the preparation of specific compounds having β-adrenergic stimulant activity. However this should not be construed as a limitation of the invention since appropriate variations in the starting materials will produce other products set forth hereinabove.

EXAMPLE 1

To one mole of butyl lithium (15% in hexane) at —40° C. under nitrogen is added gradually a solution of 142 g. (0.9 m.) of 2-bromopyridine in 340 ml. of ether, maintaining the temperature below —40° C. After stirring for 15 minutes at this temperature, a solution of 122 g. (0.9 m.) of 4-methoxybenzaldehyde in 250 ml. of ether is added, with the temperature below —15° C. The reaction mixture is stirred for 40 minutes at this temperature, quenched in 150 ml. ice/water containing 250 ml. of concentrated hydrochloric acid and the organic layer separated. The latter is extracted with water and the combined aqueous solution is made basic with concentrated ammonium hydroxide to give 4-methoxyphenyl 2-pyridylcarbinol, M.P. 126-130° C.

The above pyridylcarbinol (78 g.) is added to a stirred solution of 90 g. of potassium permanganate in 1100 ml. of water at 70° C. The reaction temperature is maintained at 90° C. for one hour, the heat is withdrawn and excess ethyl acetate is added gradually. The mixture is filtered and the filter cake is washed with boiling ethyl acetate. The combined ethyl acetate solution is dried and exaporated in vacuo to yield 4-methoxyphenyl 2-pyridylketone, M.P. 93-96° C.

To one liter of concentrated sulfuric acid containing 19.5 ml. (0.312 m.) of 77% nitric acid at —15° C. is added gradually 65.0 g. (0.305 m.) of 4-methoxyphenyl 2-pyridylketone. The reaction mixture is maintained at —5 to —8° C. for 40 minutes and then poured into excess ice. This mixture is made basic with 40% sodium hydroxide solution, with cooling, and filtered to give 3-nitro-4-methoxyphenyl 2-pyridylketone, M.P. 121-123° C.

A mixture of 5 g. (0.0194 m.) of the above prepared nitro compound and 0.6 g. of 10% palladium-on-carbon in 200 ml. of methanol is shaken on a Parr apparatus until the theoretical uptake of hydrogen is completed (60-90 minutes). The reaction mixture is filtered and evaporated in vacuo. The residual 3-amino-4-methoxyphenyl 2-pyridylketone is dissolved in 20 ml. of pyridine and 2.5 g. of methanesulfonyl chloride is added. The mixture is allowed to stand at room temperature overnight and is then added to excess water to separate 3-methanesulfonamido-4-methoxyphenyl 2-pyridylketone, M.P. 159-160° C.

To a suspension of 8.9 g. of the above prepared sulfonamide derivative in 45 ml. of methylene chloride is added gradually 9.0 ml. of boron tribromide, with stirring in an ice bath. The ice bath is removed and the mixture is stirred for one hour. The reaction mixture is evaporated in vacuo, excess methanol is added gradually and the solution boiled to dryness. The product is triturated with water and sodium bicarbonate solution to give 4-hydroxy-3-methanesulfonamidophenyl 2-pyridylketone, M.P. 101-103° C. The sulfate salt of the ketone (2.85 g.), M.P. 222-223° C., is reduced with 2.6 g. of platinum oxide in 100 ml. of methanol and for one and one-quarter hours (91% of theoretical uptake of hydrogen). The product is recrystallized with minimum water and ethanol to yield 4 - hydroxy - 3 - methanesulfonamidophenyl-2-piperidylcarbinol sulfate, M.P. 204° C. (dec.).

EXAMPLE 2

Following the procedures of Example 1, a solution of 3-amino-4-methoxyphenyl 2-pyridylketone in pyridine is treated with a slight excess of benzenesulfonyl chloride and the mixture allowed to stand at room temperature for about 18 hours to yield 3-benzenesulfonamido-4-methoxyphenyl 2-pyridylketone. The latter compound is demethylated with boron tribromide in methylene chloride solution and the resulting hydroxyphenyl ketone is reduced with platinum oxide/hydrogen in methanol solution to produce 3-benzenesulfonamido-4-hydroxyphenyl-2-piperidylcarbinol.

Similarly, reaction of the 3-amino-4-methoxyphenyl 2-pyridylketone with butanesulfonyl chloride or isopropanesulfonyl chloride as described above yields the corresponding butanesulfonamido or isopropanesulfonamido derivatives and the products, 3-butanesulfonamido-4-hydroxyphenyl-2-piperidylcarbinol and 4-hydroxy-3-isopropanesulfonamidophenyl-2-piperidylcarbinol, respectively.

EXAMPLE 3

As outlined in Example 1, a solution of 3-amino-4-methoxyphenyl 2-pyridylketone in pyridine is reacted with 4-toluenesulfonyl chloride at room temperature for 12–18 hours to give 4-methoxy-3-(4-toluenesulfonamido)-phenyl 2-pyridylketone which is demethylated with boron tribromide. The hydroxyphenyl ketone thus produced is reduced with platinum oxide catalyst to yield 4-hydroxy-3-(4-toluenesulfonamido)-phenyl-2-piperidylcarbinol.

Similarly, reaction of the above 3-aminophenyl ketone with 2-methoxybenzenesulfonyl chloride or 4-chlorobenzenesulfonyl chloride following the procedures described above yields the corresponding 2-methoxybenzenesulfonamido or 4-chlorobenzenesulfonamido derivatives and as products, 4-hydroxy-3-(2-methoxybenzenesulfonamido)-phenyl-2-piperidylcarbinol and 3-(4-chlorobenzenesulfonamido)-4-hydroxyphenyl-2-piperidylcarbinol, respectively.

EXAMPLE 4

Following the procedures of Example 1, a solution of 3-amino-4-methoxyphenyl 2-pyridylketone in pyridine is reacted with 4-benzyloxybenzenesulfonyl chloride at room temperature for 12–18 hours to give 3-(4'-benzyloxybenzenesulfonamido)-4-methoxyphenyl 2-pyridyl ketone. The methyl ether is treated with boron tribromide to give the corresponding 4-hydroxyphenyl derivative which is hydrogenated with platinum oxide in methanol to yield the product, 3 - (4' - hydroxybenzenesulfonamido)-4-hydroxyphenyl-2-piperidylcarbinol.

EXAMPLE 5

To 48.2 g. (1.98 m.) of magnesium turnings and 360 ml. of tetrahydrofuran (Grignard started by adding 1.0 ml. of ethylene dibromide and iodine crystal) is added a solution of 102 g. (0.9 m.) of 2-chloropyridine and 169 g. (0.9 m.) of ethylene dibromide in 860 ml. of tetrahydrofuran over a period of three hours at 30–35° C. The resulting mixture is stirred at room temperature about 17 hours, 123 g. (0.9 m.) of p-methoxybenzaldehyde is added over one hour below 40° C. and the mixture is stirred at room temperature for three hours. The reaction mixture is quenched in 169 ml. of concentrated hydrochloric acid and 1.2 kg. of ice, extracted with 1.6 l. of cyclohexane and the cyclohexane extracted with 300 ml. of water. The combined aqueous solutions are neutralized to pH 8–9 with concentrated ammonia and filtered to give 4-methoxyphenyl-2-pyridylcarbinol.

The above carbinol and 1 l. of water is warmed to 70° C. and a solution of 142.4 g. (0.9 m.) of patassium permanganate in 600 ml. of water is added over a period of one hour. The resulting mixture is refluxed for one hour, cooled to 60–70° C. and 600 ml. of ethyl acetate is added. The mixture is filtered and the dried filtrate is evaporated under reduced pressure to yield 4-methoxyphenyl-2-pyridylketone, M.P. 92–95° C.

To 153 ml. of 90% fuming nitric acid, cooled to 10° C. is added 49.0 g. (0.23 m.) of 4-methoxyphenyl-2-pyridylketone over one hour maintaining the temperature at 10–15° C. The mixture is stirred an additional hour at the same temperature, quenched in 320 ml. of 40% sodium hydroxide and 135 ml. of ice and filtered to give 3-nitro-4-methoxyphenyl-2-pyridylketone, M.P. 120–122° C.

A mixture of 60.0 g. (0.232 m.) of the above prepared nitro compound, 64.0 g. (0.49 m.) of 70% sodium sulfhydrate, 600 ml. of methanol, 550 ml. of water and 20.0 g. of 50% sodium hydroxide is heated to reflux over a period of 15 minutes. Methanol (300 ml.) is removed by distillation, the mixture cooled to 5° C. and filtered to give 3-amino-4-methoxyphenyl-2-pyridylketone, M.P. 87–89° C. The latter (22.8 g., 0.1 m.) and 100 ml. of pyridine is cooled to 10° C. and 12.6 g. (8.4 ml., 0.11 m.) of methanesulfonyl chloride is added, keeping the temperature below 20° C. The reaction mixture is stirred at room temperature for six hours, quenched in 600 ml. of water and filtered to give 3-methanesulfonamido-4-methoxyphenyl-2-pyridylketone, M.P. 158–159° C.

A mixture of 63.7 g. (0.208 m.) of the above prepared sulfonamide derivative, 95.7 g. (0.73 m.) of 70% sodium sulfhydrate dihydrate and 600 ml. of dimethylformamide is gradually heated to reflux (130–135° C.) and held there for two hours. After cooling to 30–35° C., 33.4 g. of 50% sodium hydroxide and 300 ml. of dimethylformamide is added and stirring and cooling are continued for one hour. The reaction mixture is filtered, the solid is dissolved in 500 ml. of water and acidified with 100 ml. of glacial acetic acid. The mixture is stirred for one hour with cooling and filtered to separate 4-hydroxy-3-methanesulfonamidophenyl-2-pyridylketone.

A mixture of 29.1 g. (0.1 m.) of the above hydroxy pyridylketone, 8 g. (0.133 m.) of ethylene glycol, 25.3 g. (0.133 m.) of p-toluenesulfonic acid hydrate and 500 ml. of toluene is heated under reflux using a water trap for six hours. An additional 8 g. of ethylene glycol is added and the mixture heated for an additional 16 hours at reflux. The reaction mixture cooled to 40° C. is treated with 200 ml. of water, the aqueous layer is separated and the toluene is extracted with 200 ml. of water. The combined aqueous solution is made basic with ammonia, filtered and the filtrate acidified (pH 5–6) with acetic acid to separate the product, 2 - (3'-methanesulfonamido-4'-hydroxyphenyl)-2-(2'-pyridyl)-1,3-dioxolane, M.P. 183–185° C.

A suspension of 17 g. (0.05 m.) of the 1,3-dioxolane in 75 ml. of water is acidified with 2.1 ml. of concentrated sulfuric acid, 0.5 g. of platinum oxide is added and the mixture is hydrogenated on a Parr shaker for 1.5 hours. The reaction mixture is filtered and the acidic filtrate is heated under reflux for six hours. Cooling precipitates the solid 4-hydroxy-3-methanesulfonamidophenyl-2-piperidylketone sulfate, M.P. 268–272° C.

The above ketone (13 g., 0.0376 m.) if suspended in 40 ml. of water, 4 g. of 5% palladium-on-charcoal catalyst is added and the mixture is hydrogenated on a Parr shaker for three hours. The catalyst is removed by filtration and 200 ml. of isopropanol is added to the filtrate. The resulting mixture is cooled and the solid removed by filtration which is dried to give erythro-4-hydroxy-3-methanesulfonamidophenyl-2-piperidylcarbinol sulfate, M.P. 208–210° C., identical to that prepared in Example 1.

EXAMPLE 6

A solution of 5.0 g. of 4-hydroxy-3-methanesulfonamidophenyl-2-piperidylcarbinol sulfate (a mixture of erythro and threo isomers obtained from the mother liquod following recrystallization from water and isopropanol as described in Example 5) in 50 ml. of water is neutralized with 0.91 ml. (0.014 m.) of aqueous ammonia and 1.7 g. (0.0147 m.) of fumaric acid is added. The mixture is warmed slightly to effect solution, then cooled to separate the fumarate salt which is removed by filtration, washed with water and recrystallized from 100 ml. of water. Recrystallization is repeated from 80 ml. and 60 ml. of water.

Purified fumarate salt (5.0 g., 0.014 m.) is suspended in 50 ml. of methanol, 2.5 g. (0.0146 m.) of anhydrous barium hydroxide is added and the mixture is stirred 15–20 minutes. Filter-aid (2.5 g.) is added, the mixture stirred 5–10 minutes and filtered. The filtrate is acidified with concentrated hydrochloric acid, filtered and the filtrate evaporated to dryness. The residue is taken up in 30 ml. of methanol, the solution is filtered and 60 ml. of ethyl acetate is added. This mixture is cooled and the precipitated hydrochloride salt is removed and dried. This salt (2.5 g.) is suspended in 12.5 ml. of methanol and 0.75 g. of triethylamine is added. The free base separates rapidly and after cooling is removed and dried, M.P. 205° C. (dec.).

The free base (1.5 g.) is suspended in 15 ml. of methanol and 0.14 ml. of concentrated sulfuric acid is added. The mixture is heated to reflux, filtered and cooled. The solid is removed by filtration, dried and recrystallized from aqueous isopropanol to give threo-4-hydroxy-3-methanesulfonamidophenyl - 2 - piperidylcarbinol sulfate, M.P. 215–216° C.

EXAMPLE 7

To a slurry of 200 g. (1.64 m.) of p-hydroxybenzaldehyde in 800 ml. of acetic acid is added dropwise 102 ml. (1.64 m.) of 71% nitric acid at room temperature. The reaction mixture is allowed to cool to room temperature, filtered and the solid washed with water to give 4-hydroxy-3-nitrobenzaldehyde, M.P. 146–148° C.

A mixture of 5.00 g. (0.03 m.) of the above nitrobenzaldehyde, 3.2 ml. 3.5 g., 0.059 m.) of ethylene glycol and 0.25 g. of p-toluenesulfonic acid in 150 ml. of toluene is refluxed under a water trap. After about 90 minutes an additional 3.2 ml. of ethylene glycol is added and at the end of about three hours the toluene is decanted, diluted with chloroform and extracted with water. The dried organic solution is evaporated in vacuo to give 4-hydroxy-3-nitrobenzaldehyde, ethylene acetal, M.P. 110–112° C.

To a mixture of 0.55 g. (0.013 m.) of a 57% dispersion of sodium hydride (in mineral oil) in 25 ml. of dimethylformamide is added a solution of 2.1 g. (0.01 m.) of 4-hydroxy-3-nitrobenzaldehyde, ethylene acetal in 25 ml. of dimethylformamide. After stirring at room temperature for a few minutes, 1.5 ml. (0.013 m.) of benzyl chloride is added, the temperature is raised to 100° C. and the reaction is allowed to continue overnight. The reaction mixture is poured into cold water, extracted with chloroform, washed with water, dried and evaporated in vacuo to leave 4-benzyloxy-3-nitrobenzaldehyde, ethylene acetal as a clear oil.

The above prepared benzyloxy compound (5.9 g., 0.02 m.) is dissolved in 125 ml. of methanol and hydrogenated over 1.0 g. of platinum oxide at an initial pressure of 60 p.s.i. After hydrogen uptake is complete the mixture is filtered and evaporated in vacuo to yield 3-amino-4-benzyloxybenzaldehyde, ethylene acetal. The latter (5.4 g., 0.02 m.) is dissolved in pyridine and 1.7 ml. (2.5 g. 0.022 m.) of methanesulfonyl chloride is added rapidly, with stirring, and the mixture is allowed to stand at room temperature overnight. The reaction mixture is poured into ice-water, filtered and the solid triturated with isopropanol to give 4-benzyloxy-3-methanesulfonamidobenzaldehyde, ethylene acetal, M.P. 145–146° C.

The ethylene acetal thus prepared (3.0 g., 0.0086 m.) is refluxed in 30 ml. of 50% aqueous acetic acid for two hours. The reaction mixture is cooled quickly in an ice bath, poured into 150 ml. of aqueous sodium chloride, extracted with methylene chloride and then washed with water, sodium bicarbonate solution and water. The dried solution is evaporated in vacuo to give 4-benzyloxy-3-methanesulfonamidobenzaldehyde, M.P. 148–151° C.

To a boiling solution of 92 g. of 4-benzyloxy-3-methanesulfonamidobenzaldehyde in 100 ml. of p-cymene is added 11 g. of 6-methylpicolinic acid over a period of three hours. After the addition is complete the mixture is allowed to cool and then extracted with 2 N hydrochloric acid. The acid extract is washed with ether, neutralized with aqueous ammonia and then extracted with ethyl acetate. The combined ethyl acetate solution is concentrated to an oil which crystallizes to yield 4-benzyloxy-3-methanesulfonamidophenyl 2 - (6 - methylpyridyl)-carbinol.

A mixture of 2.65 g. of the hydrochloride salt of the above prepared carbinol, 0.7 g. of platinum oxide and 100 ml. of methanol is hydrogenated at 25° C. on a Parr apparatus. After hydrogen uptake is complete the mixture is filtered and the filtrate concentrated to leave 4-benzyloxy - 3 - methanesulfonamidophenyl 2-(6-methylpiperidyl)-carbinol hydrochloride.

The above carbinol (2 g.) with 0.6 g. of 10% palladium-on-carbon in 100 ml. of methanol is hydrogenated on a Parr apparatus at 25° C. After hydrogen uptake is complete the reaction mixture is filtered and the filtrate concentrated to give 4-hydroxy-3-methanesulfonamidophenyl 2-(6-methylpiperidyl)-carbinol hydrochloride.

EXAMPLE 8

Following the procedures of Example 7, a solution of 4-benzyloxy-3-methanesulfonamidobenzaldehye in p-cymene is reacted with 5-butylpicolinic acid at reflux temperature for about three hours to yield 4-benzyloxy-3-methanesulfonamidophenyl 2-(5-butylpyridyl) - carbinol. The latter compound is reduced with platinum oxide and hydrogen and the resulting piperidylcarbinol is debenzylated with palladium-on-carbon and hydrogen to produce 4 - hydroxy-3-methanesulfonamidophenyl 2-(5-butylpiperidyl)-carbinol.

Similarly, reaction of 4-benzyloxy-3-methanesulfonamidobenzaldehyde with 4-phenoxypicolinic acid as described above yields the corresponding 4-phenoxypyridyl derivative and upon reduction and debenzylation furnishes the product, 4 - hydroxy - 3 - methanesulfonamidophenyl 2-(4-phenoxypiperidyl)-carbinol.

EXAMPLE 9

As outlined in Example 7, a solution of 4-benzyloxy-3-methanesulfonamidobenzaldehyde in p-cymene is treated with 6-phenylpicolinic acid at reflux temperature for about three hours to give 4-benzyloxy-3-methanesulfonamidophenyl 2-(6-phenylpyridyl)-carbinol which is reduced to the piperidyl derivative with platinum oxide/ hydrogen. The latter compound is debenzylated with palladium-on-carbon and hydrogen to yield 4-hydroxy-3-methanesulfonamidophenyl 2 - (6 - phenylpiperidyl)-carbinol.

Similarly, reaction of the above benzaldehyde with 4-benzylpicolinic acid (obtained by partial oxidation of 4-benzyl-2-picoline with potassium permaganate) following the procedures described above yields the corresponding 4 - benzyloxy - 3 - methanesulfonamidophenyl 2-(4-benzylpyridyl)-carbinol and as a final product, 4-hydroxy-3-methanesulfonamidophenyl 2 - (4 - benzylpiperidyl)-carbinol.

EXAMPLE 10

| Ingredients | Mg./tablet | |
|---|---|---|
| 4-hydroxy-3-methane sulfonamidophenyl-2-piperidylcarbinol sulfate monohydrate | [1] 1.19 | [2] 11.93 |
| Lactose | 63 | 100 |
| Starch | 4.9 | 9 |
| Magnesium stearate | 0.35 | 0.6 |

[1] Equivalent to 1 mg. of the free base.
[2] Equivalent to 10 mg. of the free base.

A granulation of the above ingredients is compressed into tablets using 7/32 inch diameter punches for the 1 mg. tablets and 9/32 inch diameter punches for the 10 mg. tablets. Additional strengths such as 0.5, 5 and 20 mg. tablets are prepared using appropriate variations in the above formulations.

EXAMPLE 11

Ingredients: Mg./dose
    4-hydroxy-3-methanesulfonamidophenyl-2-piperidylcarbinol sulfate monohydrate ___ [1] 0.716
    Sorbitan trioleate (Span 85) _____ 0.15
    Trichloromonofluoromethane (Freon 11) __ 15
    Dichlorodifluoromethane (Freon 12) _____ 30
    Dichlorotetrafluoroethane (Freon 114) ___ 15

[1] Equivalent to 0.6 mg. of the free base.

The above ingredients in an aerosol dispensing system with a metered valve furnishes the indicated amounts per dose.

What is claimed is:
1. A compound of the formula:

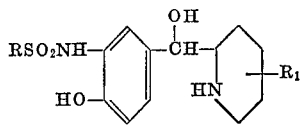

or a pharmaceutically acceptable acid addition salt of said compound, wherein:
R is lower alkyl, straight or branched chain, of from 1 to 4 carbon atoms, phenyl, tolyl, chlorophenyl, methoxyphenyl or hydroxyphenyl; and
$R_1$ is hydrogen, lower alkyl, straight or branched chain, of from 1 to 5 carbon atoms, phenyl, benzyl or phenoxy.

2. A compound according to claim 1 in which $R_1$ is hydrogen.
3. A compound according to claim 2 in which R is lower alkyl.
4. A compound according to claim 3 in which R is methyl, being the compound 4-hydroxy-3-methanesulfonamidophenyl-2-piperidylcarbinol.
5. The erythro diastereoisomer of the compound according to claim 4.
6. The threo diastereoisomer of the compound according to claim 4.
7. A compound according to claim 2 in which R is phenyl, being the compound 3-benzenesulfonamido-4-hydroxyphenyl-2-piperidylcarbinol.
8. A compound according to claim 1 in which $R_1$ is lower alkyl.
9. A compound according to claim 8 in which $R_1$ is methyl.
10. A compound according to claim 9 in which $R_1$ is 6-methyl and R is methyl, being the compound 4-hydroxy-3-methanesulfonamidophenyl - 2 - (6 - methylpiperidyl)-carbinol.

References Cited
UNITED STATES PATENTS 2,976,291   3/1961   Jacob et al. _____ 424—267

HENRY R. JILES, Primary Examiner

S. D. WINTERS, Assistant Examiner

U.S. Cl. X.R.

260—297 R, 296 R, 294.8 F, 293.52, 556 A, 556 AR, 340.9; 424—267